United States Patent [19]
Gottfried

[11] Patent Number: 5,985,385
[45] Date of Patent: Nov. 16, 1999

[54] FIRE AND HEAT PROTECTION WRAP FOR CONDUITS, CABLE TRAYS, OTHER ELECTRICAL TRANSMISSION LINES AND GAS AND OIL PIPELINES

[75] Inventor: Samuel Gottfried, Riverdale, N.Y.

[73] Assignee: No Fire Technologies, Inc., Upper Saddle River, N.J.

[21] Appl. No.: 08/862,833

[22] Filed: May 23, 1997

[51] Int. Cl.⁶ .................................. B32B 1/08; F16L 11/02
[52] U.S. Cl. ......................... 428/34.6; 405/157; 405/216; 428/34.7; 428/36.91; 428/920; 442/117; 442/138
[58] Field of Search .................................. 428/34.6, 34.7, 428/35.9, 36.1, 36.91, 913, 920; 442/117, 138; 138/143, 145, 153; 405/157, 211, 216

[56] References Cited

U.S. PATENT DOCUMENTS

| | | | |
|---|---|---|---|
| 5,319,155 | 6/1994 | Maroist | 174/28 |
| 5,442,131 | 8/1995 | Borgwarth | 174/15.6 |
| 5,660,899 | 8/1997 | Rockney et al. | 428/34.7 |
| 5,681,640 | 10/1997 | Kiser | 428/181 |

Primary Examiner—Blaine Copenheaver
Attorney, Agent, or Firm—Ezra Sutton

[57] ABSTRACT

A fire and heat protection wrapping system for wrapping conduits, cable trays, transmission lines, cables and other electrical transmission devices associated with the transmission of electricity and electrical signals, and gas and oil pipelines. The protection wrapping system includes a concentric composite laminate structure having a plurality of concentric layers for the protection of the transmission devices which are exposed to high temperatures in excess of three (3) hours in duration. The plurality of concentric layers incudes an outer first layer, an inner second layer, an inner third layer and an inner core fourth layer for wrapping the electrical transmission device. The outer first layer is a fiberglass textile having an intumescent coating for resistance to fire, heat, water, impact and the outer first layer surrounds the inner second layer. The inner second layer is a metal foil layer for reflecting heat and eliminates the convection transfer of heat; and the inner second layer surrounds the inner third layer. The inner third layer is a low conductivity refractory blanket for reducing the transmission of heat; and the inner third layer surrounds the inner core fourth layer. The inner core fourth layer is a water jacket layer for absorbing heat from the source or fire and absorbing heat from the electrical transmission device and functions as an endothermic layer; and the inner core fourth layer surrounds the core transmission device.

17 Claims, 9 Drawing Sheets

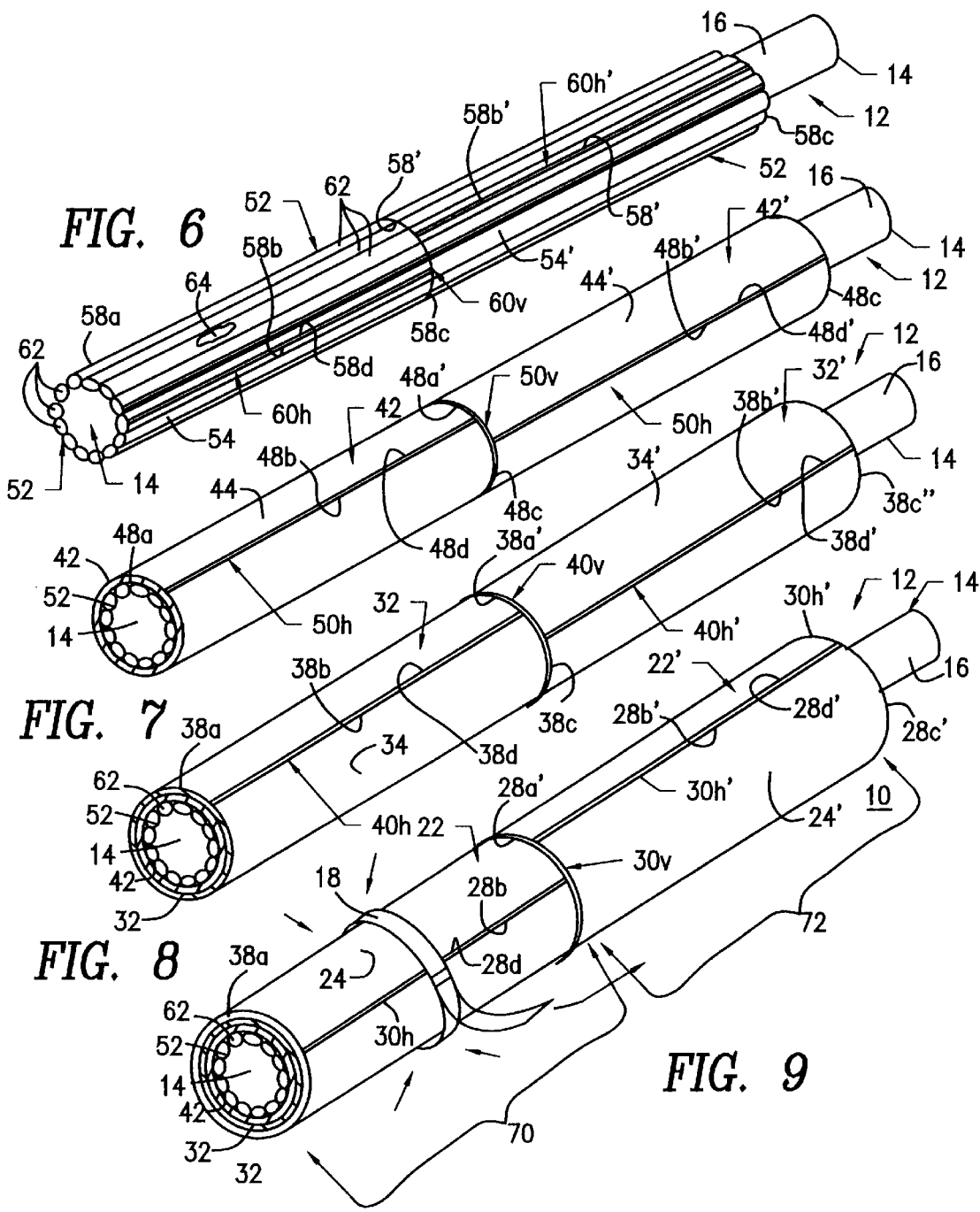

FIRE AND HEAT PROTECTION WRAP FOR CONDUITS, CABLE TRAYS, OTHER ELECTRICAL TRANSMISSION LINES AND GAS AND OIL PIPELINES

FIELD OF THE INVENTION

The present invention relates to a fire and heat protection system for wrapping conduits, cable trays, transmission lines, cables and other electrical transmission devices associated with the transmission of electricity and electrical signals, and gas and oil pipelines and other pipelines for the transmission of combustible products. More particularly, the new and improved thermal protection wrapping system includes a concentric composite laminate structure having a plurality of concentric layers for the protection of the transmission devices and pipelines in applications where there is severe exposure to high temperatures in excess of three (3) hours in duration.

BACKGROUND OF THE INVENTION

Fire retardant and thermal blankets have been used to provide thermal protection to electrical transmission systems, devices and equipment at temperatures up to 2000° F. for periods of one-half hour (½ hr.) to three hours (3 hrs.). Typical electrical transmission systems requiring such thermal protection include cables, conduits, cable trays, junction boxes, hangars, thermal shorts, condulets, transmission lines, and other electrical transmission devices associated with the transmission of electricity and electrical signals; and gas and oil pipelines. These types of fire retardant and thermal blankets used in protective wrapping systems have multiple facility applications for operational uses that include coal, gas or oil generating plants; electrical and gas utilities; power generating stations; nuclear power generating facilities; power distribution stations; chemical and pharmaceutical manufacturing facilities; shipping and marine facilities; military installations; telecommunication facilities; airports and the like.

There are two basic types of thermal protection wrapping systems that provide fire and heat protection: 1.) thermal insulation systems and 2.) endothermic systems. Thermal insulation systems rely on wraps, typically ceramic blankets, for reducing thermal conductivity and thereby reducing the temperature rise within the electrical transmission system. Endothermic systems rely on thermal materials that absorb heat from the source, thereby reducing the amount of heat transmitted to the electrical transmission system being protected. Typically, thermal blankets used in thermal insulation systems are bulky, requiring a large amount of space that often is not available. Materials used in endothermic systems are typically very heavy and expensive, and require additional supports or reinforcements for the system. In some cases, the additional weight cannot be accommodated, due to seismic limitations of the facility.

Thus, the current thermal protection wraps used to protect electrical transmission systems for long periods, in excess of three hours, are typically expensive, heavy, difficult and cumbersome to install, and have a large diameter. The limitations for practical application of these wrapping system products are very severe.

Currently, there is no single thermal protection wrapping system having all of the following desirable features:

1. Low heat transmission to the electrical transmission device;
2. Absorption of excess heat generated from the electrical transmission device;
3. Ease of installation on all types and configurations of conduits, cable trays, transmission lines, cables and the like including bends, thermal shorts, hangars and areas near walls and other confined areas;
4. Easily adaptable for variations of configurations encountered during onsite installation;
5. Dry application of thermal material layers for the protection of the electrical transmission device, requiring no liquids or any drying time;
6. A light-weight thermal protection wrapping system, thereby eliminating the requirements for reinforcements and additional supports to the wrapped electrical transmission device;
7. Low ampacity deration within the electrical transmission devices, as in conduits, cables, transmission lines and the like;
8. Multiple facility applications for operational use in coal, gas or oil generating plants; electrical and gas utilities; power generating stations; nuclear power generating facilities; power distribution stations; chemical and pharmaceutical manufacturing facilities and the like; and
9. Entirely passive system, requiring no active devices.

Additionally, in some applications the current thermal protection wrapping systems are impractical for reasons other than fire and heat protection, as the wrapping system may lack resistance to water and chemicals, impact resistance, temperature fluctuation resistance and resistance to other environmental factors; and because of these factors, these wrapping systems are limited in their applications.

There remains a need for a new and improved thermal protection wrapping system that would provide substantial protection from fire and heat to electrical transmission devices for a long duration of time if a fire were to occur by reducing the flammability of the materials within the composite laminate structure, without adding a large amount of size and weight to the wrapping system. In addition, the thermal protection wrapping system should be easy to install and durable; and adaptable for use on many configurations and types of electrical and transmission equipment.

DESCRIPTION OF THE PRIOR ART

Fire and thermal protection wrapping and insulation systems of various designs, configurations and materials of construction have been disclosed in the prior art. For example, U.S. Pat. No. 5,319,155 to Maroist discloses a heat and fireproof duct for electrical and communication wires and the like. The duct includes an inner tube in which the electrical wires are disposed therein; and this inner duct is positioned inside an outer tube so as to provide a continuous inner space between the tubes, which completely surrounds the inner tube. A water inlet is in communication with the inner space and water is allowed to penetrate into the inner space upon the opening of a valve. The valve is operated by a fire detector. Upon activation of the valve in case of fire, the water circulates through the inner space and exits into a drain. This fire proofing system constitutes a fire and heat barrier for the wires of a building, for example. This prior art patent does not disclose the particular structure and design of the thermal protection wrapping system of the present invention.

U.S. Pat. No. 5,442,131 to Borgwarth discloses a high energy coaxial cable cooling apparatus. The cooling apparatus includes a system for cooling a coaxial cable wherein cooling fluid is circulated along the cable and through a heat exchanger to dissipate the cable heat generated by the high energy transferred by the cable. The cable has inner and outer concentric conductors separated by an inner dielectric layer and surrounded by an outer dielectric layer. Channels in the two dielectric layers provide for the fluid flow along the cable which carries away the heat. This prior art patent does not disclose the particular structure and design of the thermal protection wrapping system of the present invention.

None of the aforementioned prior art patents disclose the concentric composite laminate structure and design of the heat and fire protection wrapping system of the present invention.

Accordingly, it is an object of the present invention to provide a fire and thermal protection wrapping system for wrapping conduits, cables, cable trays, transmission lines and other electrical transmission systems associated with the transmission of electricity and electrical signals and gas and oil pipelines which is effective at continuously maintained temperatures up to 2200° F. for at least three hours (3 hrs.) in duration.

Another object of the present invention is to provide a fire and thermal protection wrapping system that is easy to install, and can be used on all types of equipment and configurations which include cables, conduits, cable trays, condulets, junction boxes, supports, hangars, thermal shorts, and on all configurations of transmission lines having joints, bends, tees, oblique angles and the like.

Another object of the present invention is to provide a fire and thermal protection wrapping system that is relatively thin and light weight; and can easily be adapted on the job site to adapt to all types of transmission equipment configurations.

Another object of the present invention is to provide a fire and thermal protection wrapping system that is durable, and can be protected against severe environmental conditions of water, chemicals, impact, temperature fluctuations of extreme hot and cold, and humidity.

Another object of the present invention is to provide a fire and thermal protection wrapping system that has multiple industry facility applications for operational use that include coal, gas or oil generating plants; electrical and gas utilities; power generating stations; nuclear power generating facilities; power distribution stations; chemical and pharmaceutical manufacturing facilities; shipping and marine facilities; military installations; telecommunication facilities; airports and the like.

Another object of the present invention is to provide a fire and thermal protection wrapping system that includes a novel combination of radiation and heat reflection, low thermal conduction, and high endothermic heat absorption.

Another object of the present invention is to provide a fire and thermal protection wrapping system that includes a concentric composite laminate structure having a plurality of concentric layers for the protection of the electrical transmission devices or pipelines being wrapped.

Another object of the present invention is to provide a fire and thermal protection wrapping system that provides protection layers including a heat reflection outer shell, an inner reflective lining, a low thermal conductance layer, and an endothermic heat absorption layer surrounding the inner core cable or conduit.

Another object of the present invention is to provide a fire and thermal protection wrapping system that provides a low ampacity derating for electrical cables and conduits.

A further object of the present invention is to provide a fire and thermal protection wrapping system that can be easily applied and mass produced in an automated and economical manner, and is cost efficient for a variety of applications.

SUMMARY OF THE INVENTION

In accordance with the present invention, there is provided a fire and heat protection wrapping system for wrapping conduits, cable trays, transmission lines, cables and other electrical transmission devices associated with the transmission of electricity and electrical signals and gas and oil pipelines. The thermal protection wrapping system includes a concentric composite laminate structure having a plurality of concentric layers for the protection of the transmission devices which are exposed to high temperatures in excess of three (3) hours in duration.

The plurality of concentric layers incudes an outer first layer, an inner second layer, an inner third layer and an inner core fourth layer for wrapping the transmission device. The outer first layer is a fiberglass textile having an intumescent coating for resistance to fire, heat, water, and impact; and the outer first layer surrounds the inner second layer and has an inner surface wall in contact with the inner second layer.

The inner second layer is a metal foil layer for reflecting heat and eliminating the convection transfer of heat; and the inner second layer surrounds the inner third layer and has an inner surface wall in contact with the inner third layer.

The inner third layer has a low conductivity refractory blanket for reducing the transmission of heat; and the inner third layer surrounds the inner core fourth layer and has an inner surface wall in contact with the inner core fourth layer.

The inner core fourth layer is a water jacket layer for absorbing heat from the source of a external fire or heat; or absorbing heat from the electrical transmission device and functions as an endothermic layer; and the inner core fourth layer surrounds the core electrical transmission device and has an inner surface wall in contact with the transmission device.

BRIEF DESCRIPTION OF THE DRAWINGS

Further objects, features, and advantages of the present invention will become apparent upon consideration of the detailed description of the presently-preferred embodiments, when taken in conjunction with the accompanying drawings wherein:

FIG. 6 is a front perspective view of the thermal protection wrapping system of the present invention showing the inner core fourth layer attached to the outer surface cable wall of the coaxial cable core in completing the first assembling step for forming the concentric composite laminate structure;

FIG. 7 is a front perspective view of the thermal protection wrapping system of the present invention showing the inner third layers attached to the outer surface walls of the inner core fourth layers in completing the second assembling step for forming the concentric composite laminate structure;

FIG. 8 is a front perspective view of the thermal protection wrapping system of the present invention showing the inner second layer attached to the outer surface walls of the inner third layer in completing the third assembling step for forming the concentric composite laminate structure;

FIG. 9 is a front perspective view of the thermal protection wrapping system of the present invention showing the outer first layer attached to the outer surface wall of the inner second layer in completing the fourth assembling step for the complete formation of the concentric composite laminate structure of the thermal protection wrapping system;

DETAILED DESCRIPTION OF THE PREFERRED EMBODIMENT

Figure 1:
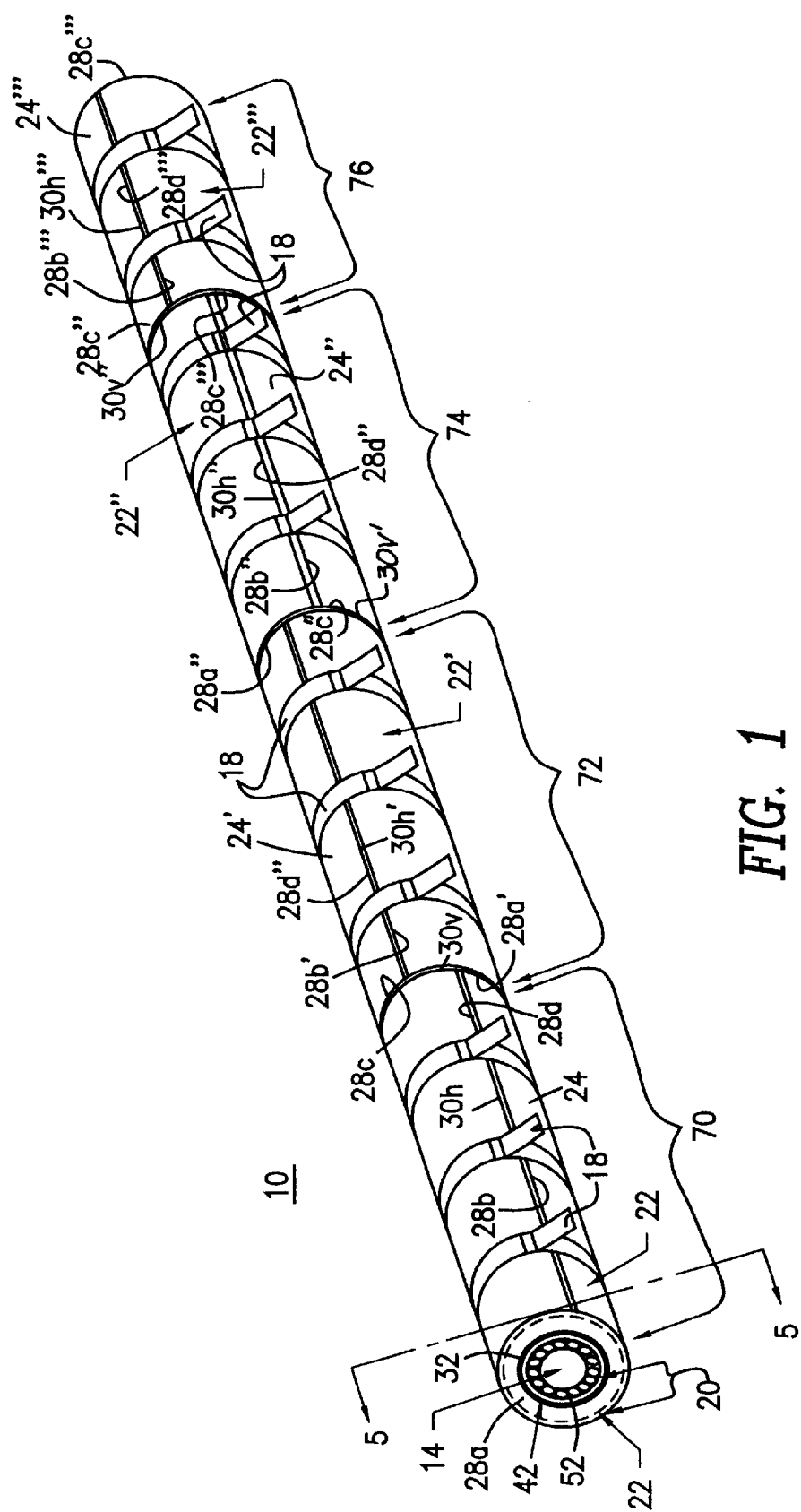
FIG. 1 is a front perspective view of the thermal protection wrapping system of the preferred embodiment of the present invention showing the concentric composite laminate structure having a plurality of concentric layers in the assembled state for protecting the transmission coaxial cable from fire and heat.
Figure 2:
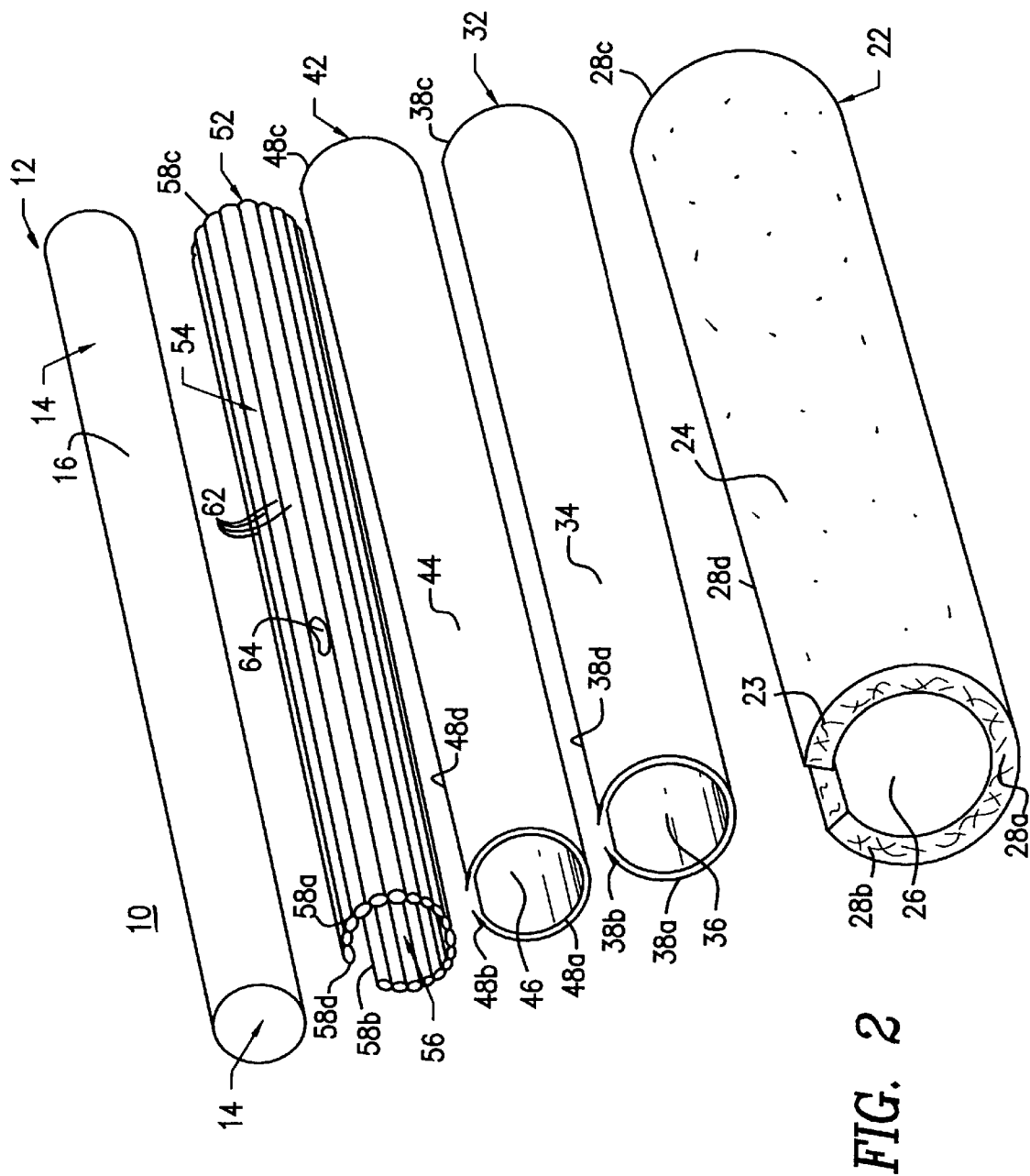
FIG. 2 is an exploded front perspective view of the thermal protection wrapping system of the present invention showing the concentric layers which are the outer first layer, the inner second layer, the inner third layer and the inner core fourth layer in preparation for concentric attachment to the coaxial cable.
Figure 3:
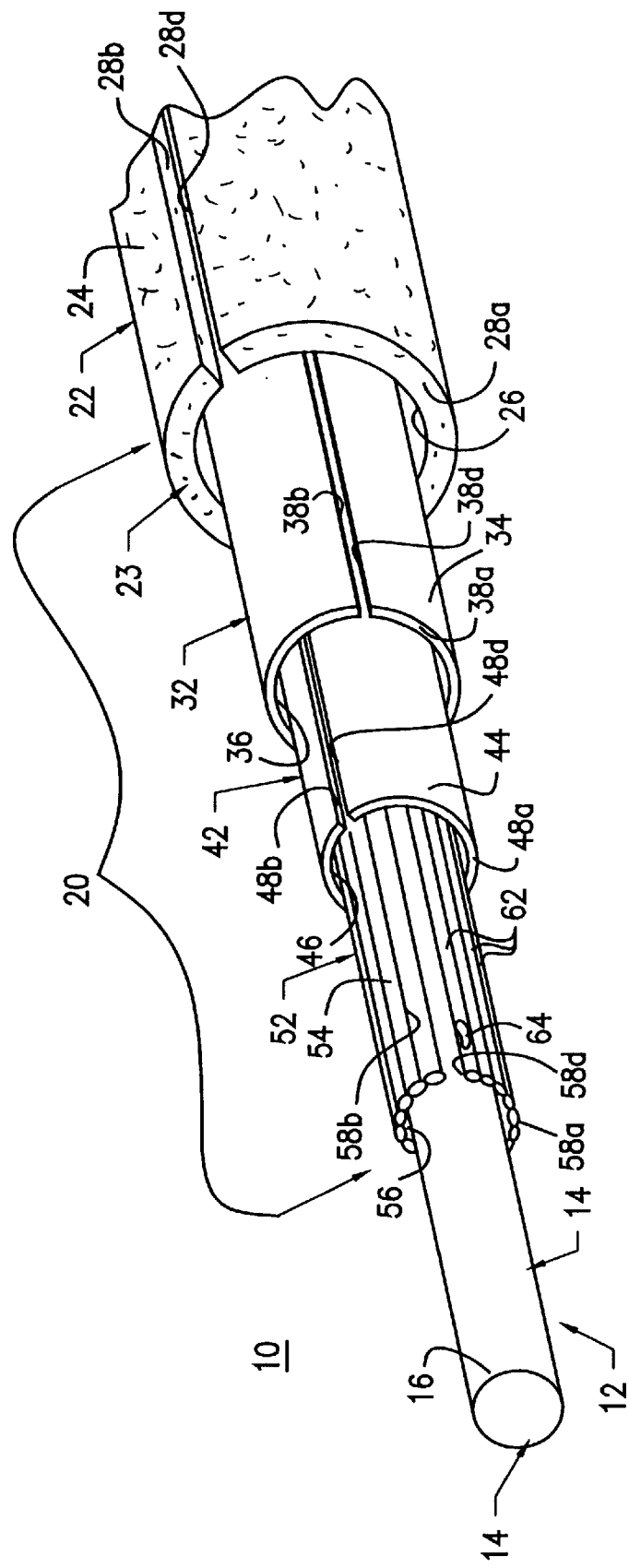
FIG. 3 is an exploded front perspective view of the thermal protection wrapping system of the present invention showing the concentric layers which are the outer first layer, the inner second layer, the inner third layer and the inner core fourth layer in preparation for concentric attachment to the coaxial cable.
Figure 4:
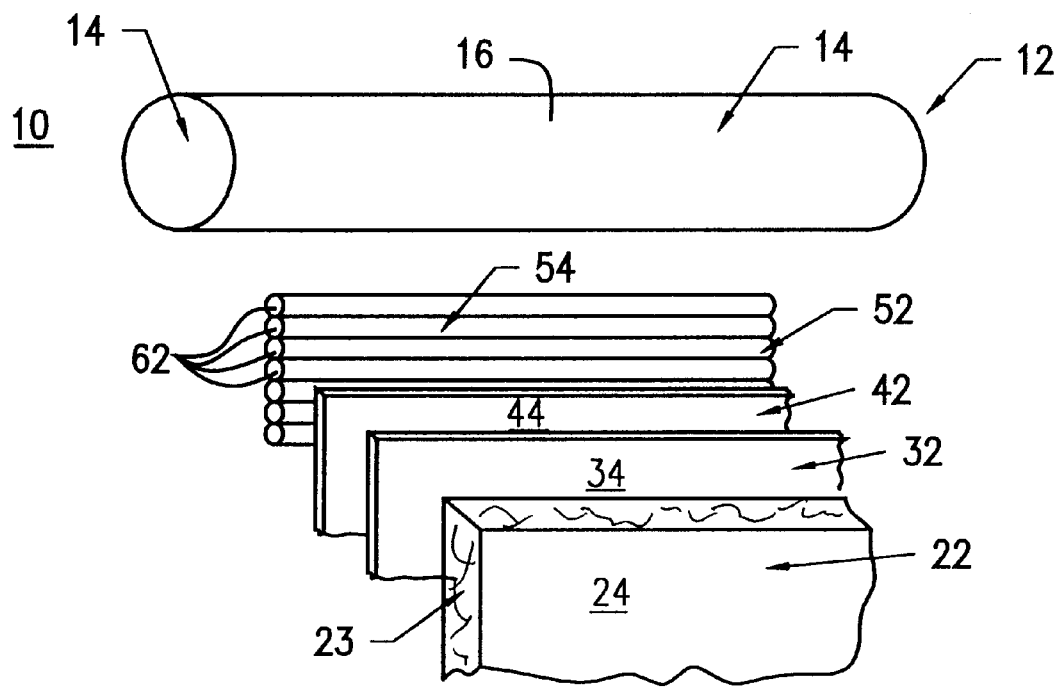
FIG. 4 is an exploded partial front perspective view of the thermal protection wrapping system of the present invention showing the layers in sheet form in an unassembled state being readied for the concentric attachment to the coaxial cable.

The preferred embodiment of the present invention provides for a fire and heat/thermal protection wrapping system 10 for the wrapping of an electrical transmission system(s) 12 having coaxial cables 14, conduits, cable trays, transmission lines or other electrical transmission devices associated with the transmission of electricity and electrical signals; and gas and oil pipelines as depicted in detail FIGS. 1 through 9. The thermal protection wrapping system 10, as shown in FIGS. 1 and 4, is formed from a four-ply concentric composite laminate structure 20 having a plurality of concentric layers 22, 32, 42 and 52 which provides for the fire and heat protection of the electrical transmission devices that are being wrapped. The concentric composite laminate structure 20 includes an outer first layer 22, an inner second layer 32, an inner third layer 42 and an inner core fourth layer 52 circumjacently attached to the outer surface cable wall 16 of the coaxial cable 14 of electrical transmission system 12.

The outer first layer 22 includes a fire retardant coating 23 on fiberglass textile and includes an outer surface wall 24, an inner surface wall 26 and perimeter wall edges 28a, 28b, 28c and 28d. In the assembled states, as shown in FIGS. 1 and 8, perimeter wall edges 28c and 28a' are adjacent and in contact with each other to form a vertical contact line, butt joint or overlap joint 30v; and perimeter wall edges 28b and 28d; 28b' and 28d' are adjacent and in contact with each other to form horizontal contact lines, butt joints or overlap joints 30h and 30h'. Additionally, in the assembled state, the outer first layer 22 encircles the inner second layer 32 such that the inner surface wall 26 of outer first layer 22 is adjacent to and in contact with the outer surface wall 34 of inner second layer 32, as shown in FIGS. 1, 2, 3 and 9 of the drawings.

The fire retardant coating 23 on the fiberglass textile is a fire-retardant, intumescent coating consisting of a foaming agent, a blowing agent, a charring agent, a binding agent, a solvent and a pigment; flame spread reduction agents; thermal transmission reductive agents; refractory fibers; and stabilizers. The intumescent coating also includes mechanical enhancer components for physical impact resistance and adhesion enhancement; water resistance agents and efflorescence reduction agents; and elasticity agents to increase resistance to cracking and shrinking, and to also improve ease of spraying and coating. Thus, the outer first layer 22 of the fiberglass textile has intumescent coating 23 for resistance to fire, heat, water, impact, and shrinkage.

The inner second layer 32 is a metal foil layer and includes an outer surface wall 34, an inner surface wall 36 and perimeter wall edges 38a, 38b, 38c and 38d. In the assembled state, as shown in FIG. 7, perimeter wall edges 38c and 38a' are adjacent and in contact with each other to form a vertical contact line, butt joint or overlap joint 40v; and perimeter wall edges 38b and 38d; 38b' and 38d' are adjacent and in contact with each other to form horizontal contact lines, butt joints or overlap joints 40h and 40h'. Additionally, in the assembled state, the inner second layer 32 encircles the inner third layer 42 such that the inner surface wall 36 of the second layer 32 is adjacent to and in contact with the outer surface wall 44 of the third layer 42, as shown in FIGS. 2, 3 and 8 of the drawings.

The metal foil layer 32 is used for reflecting heat, as a heat reflector, and eliminates the convection transfer of heat from the coaxial cable 14 of electrical transmission system 12. The metal foil layer 32 is made from sheets formed of steel foil, stainless steel foil or aluminum foil.

The inner third layer 42 is a low thermal conductance, refractory blanket layer and includes an outer surface wall 44, an inner surface wall 46 and perimeter wall edges 48a, 48b, 48c and 48d. In the assembled state, as shown in FIG. 6, perimeter wall edges 48c and 48a' are adjacent and in contact with each other to form a vertical contact line, butt joint or overlap joint 50v; and perimeter wall edges 48b and 48d; 48b' and 48d' are adjacent and in contact with each other to form horizontal contact lines, butt joints or overlap joints 50h and 50h'. Additionally, in the assembled state, the third layer 42 encircles the inner core fourth layer 52 such that the inner surface wall 46 of the third layer 42 is adjacent to and in contact with the outer surface wall 54 of the inner core fourth layer 52, as shown in FIGS. 2, 3 and 7 of the drawings.

The low thermal conductance, refractory blanket layer 42 is used for reducing the transmission of heat from the coaxial cable 14 of electrical transmission system 12. The low thermal conductivity refractory blanket layer 42 is selected from the group consisting of ceramic fiber blankets; silicon dioxide and calcium oxide fiber blankets; high silica fiber blankets; fiber glass blankets; and equivalents thereof.

Figure 5:
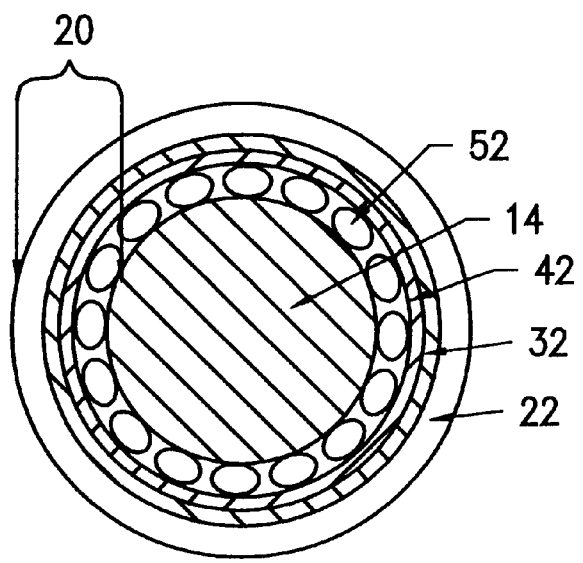
FIG. 5 is an enlarged cross-sectional view of the thermal protection wrapping system of the present invention taken along lines 5—5 of FIG. 1 showing the layers of the concentric composite laminate structure in the assembled state where each layer is concentrically surrounding each inner layer.

The inner core fourth layer 52 is a water jacket layer for absorbing heat and includes an outer surface wall 54, an inner surface wall 56 and perimeter wall edges 58a, 58b, 58c and 58d. The inner core fourth layer 52 further includes a plurality of encapsulated and sectionalized compartments 62 each having water 64 therein. In the assembled state, as shown in FIG. 5, perimeter wall edges 58c and 58a' are adjacent and in contact with each other to form a vertical contact line, butt joint or overlap joint 60v, and perimeter wall edges 58b and 58 d; 58b' and 58d' are adjacent and in contact with each other to form horizontal contact lines, butt joints or overlap joints 60h and 60h'. Additionally, in the assembled state, the inner core fourth layer 52 encircles the coaxial cable core 14 of the electrical transmission system 12 such that the inner surface wall 56 of the inner core fourth layer 52 is adjacent to and in contact with the outer surface cable wall 16 of the coaxial cable core 14, as shown in FIGS. 2, 3 and 6 of the drawings.

The water jacket layer 52 has a plurality of elongated and sectionalized compartments/pouches 62 with each pouch 62 having therein water 64 or other liquid coolants such as glycols, freons, alcohols, and any antibacterial, antifungal, or denaturizers that may be necessary and the like, as shown in FIGS. 2, 3 and 5 of the drawings. The compartments/pouches 62 are made of materials selected from the group consisting of plastics, polypropylene, vinyls, MYLAR™ being polyethyleneterephthalates, metallized MYLAR™ being metallized polyethyleneterephthalates, metallized polypropylene, TYVEK™ high density polyethylenes, NOMEX™ being polyisophthaloil-chloride-M-phenylenediamines, KEVLAR™ being poly-para-phenyleneterephthalamides, and equivalents thereof.

This wrapping system 10 is used on most material substrates and is used in severe environmental conditions where heat, cold and humidity are an important factor in the standards for cables, conduits, cable trays and other electrical equipment and electrical transmission facility systems 12 and gas and oil pipeline. The fire and heat protection wrapping system 10 is used on a variety of material substrates such as iron, steel, aluminum and other metals, composites, plastics, PVC, thermoplastics, epoxies, neoprene, and the like.

Detailed Description of the Alternate Embodiment 100

The fire and thermal protection wrapping system 100 of the alternate embodiment of the present invention is represented in FIGS. 10 through 13 of the drawings. In particular, thermal protection wrapping system 100 is used on a cable tray 102 having front and rear openings 104 and 106 in which multiple layers of water jacket layers 52, refractory blanket layers 42, metal foil layers 32, and fire retardant outer layers 22 are used to form a multi-ply concentric composite laminate structure 110. The multiply concentric composite laminate structure 110, as shown in FIGS. 10 to 13, is formed on the outer surfaces 108a, 108b, 108c, and 108d of cable tray 102 and includes the following eleven (11) concentric layers. The first and inner most layer is a metal foil layer 32, followed by the other concentric layers being a water jacket layer 52, a refractory blanket layer 42, another metal foil layer 32, another water jacket layer 52, another refractory blanket layer 42, another water jacket layer 52, another refractory blanket layer 42, another metal foil layer 32, an inner second fire retardant layer 22, and an outer first fire retardant layer 22, thus completing the formation of the multi-ply concentric composite laminate structure 110 of thermal protection wrapping system 100 of the present invention. The three inner layers 32, 42 and 52 may be arranged in any order.

Examples of use for the Fire and Thermal Protection Wrapping System 10

Example 1

A steel conduit having a diameter of ¾ of an inch and wall thickness of 3/16 inch is wrapped with a MYLAR™ pouch water jacket 52 using 1 pound of water per foot of conduit. The water jacket 52 is then wrapped in successive concentric layers with a 0.5 inch thick (8 lb/ft$^3$ density) refractory blanket 42, a 0.002 inch stainless steel foil 32, and two outer layers 22 of NoFire Textile Style 2035/SH2. The total diameter is 4¾ inches, and the weight is less than 2.5 lbs/foot.

The conduit is heated in an oven configuration for one hour protocol specified by the Nuclear Regulatory Commission (NRC) Generic Letter 86-10 Supplement 1. The result is an average conduit temperature rise of less than 250° F. above ambient for in excess of 78 minutes.

Example 2

A steel conduit having a diameter of ¾" and wall thickness of 3/16" inch is wrapped with a water jacket layer 52, a refractory fiber blanket 42, and a steel foil 32, as described in Example 1. Then there are two additional layers of water jacket interweaved with two layers of 0.5 inch ceramic blanket. On top of this there is one layer on 0.002 inch stainless steel foil and two layers of NoFire Textile Style 2035/SH2. The total diameter is 12 inches, and the weight is less than 9 lbs/foot.

The sample is tested according to the NRC Generic Letter 86-10 Supplement 1 protocol for three hours. The result is an average conduit temperature rise of less than 250° F. above ambient for in excess of 275 minutes.

Example 3

A wrapping system identical to the one used in Example 1 is applied to a ¾ inch diameter conduit having a 900 bend. The sample is tested identically to the one in Example 1.

The result is an average conduit temperature rise of less than 250° F. above ambient for in excess of 75 minutes.

Operation of the Present Invention

In use, the thermal protection wrapping system 10 of the preferred embodiment, as shown in FIGS. 1, 3, 4, and 6 to 9, includes a plurality of sections 70, 72, 74 and 76 that are located side-by-side on the electrical transmission device 12 to form the continuous thermal protection wrapping system 10. The user first places a plurality of inner core fourth layers 52 to surround and attach to the coaxial cable 14 of electrical transmission device 12. As depicted in FIGS. 3, 4 and 6, the inner surface wall 56 of the water jacket layer 52 encircles and is adjacent to the outer surface cable wall 16 of coaxial cable 14, such that the plurality of sectionalized compartments 62 having water 64 therein are in horizontal alignment along the length of the coaxial cable 14. The user cuts the circumference (width) of the inner core fourth layers 52, as shown in FIG. 6, such that when the water jacket layers 52 and 52' have encircled the coaxial cable core 14, the perimeter wall edges 58b and 58d, 58b' and 58d' are adjacent to and in contact with each other, where they meet to form horizontal contact lines, butt joints or overlap joints (overlapped by 1–3 inches of material) 60h and 60h'. Further, when perimeter wall edges 58c and 58a' of adjacent layers 52 and 52' are adjacent to and in contact with each other, they meet to form a vertical contact line, a butt joint or overlap joint 60v, as shown in FIG. 6. The water jacket layers 52 and 52' are held in place by tapes or bands made of plastic, metal, vinyl, rubber, TEFLON™, reinforced fiberglass, duct tape or the like (not shown). This completes the first assembling step for forming the concentric composite laminate structure 20.

The installer next uses a plurality of inner third layers 42 for surrounding the inner core fourth layers 52, as shown in FIGS. 3, 4 and 7 of the drawings. The installer places the inner surface wall 46 of the low thermal conductivity blanket layer 42 circumjacently to the outer surface wall 54 of the water jacket layer 52. The installer cuts the circumference (width) of the inner third layers 42, as shown in FIG. 7, such that when the blanket layers 42 and 42' have encircled the water jacket layers 52 and 52', the perimeter wall edges 48b and 48d, 48b' and 48d' are adjacent to and in contact with each other, where they meet to form horizontal contact lines, butt joints or overlap joints 50h and 50h'. Further, when perimeter wall edges 48c and 48a' of successive layers 42 and 42' are adjacent to and in contact with each other, they meet to form a vertical contact line, butt joint or overlap joint 50v, as shown in FIG. 7 of the drawings. The low thermal conductivity blanket layers 42 and 42' are held in place by tapes or bands made of metal, plastic, vinyl, rubber, TEFLON™, reinforced fiberglass, duct tape or the like (not shown). This completes the second assembling step for forming the concentric composite laminate structure 20.

The installer in the next step uses a plurality of inner second layers 32 for surrounding the inner third layers 42, as shown in FIGS. 3, 4 and 8 of the drawings. The installer places 25 the inner surface wall 36 of the metal foil layer 32 circumjacently to the outer surface wall 44 of the conductance blanket layer 42. The installer cuts the circumference (width) of the inner second layers 32, as shown in FIG. 8, such that when the metal foil layers 32 and 32' have encircled the low thermal conductivity blanket layers 42 and 42', the perimeter wall edges 38b and 38d, 38b' and 38d' are adjacent to and in contact with each other, where they meet to form horizontal contact lines, butt joints or overlap joints 40h and 40h'. Further, when perimeter wall edges 38c and 38a' of adjacent layers 32 and 32' are adjacent to and in contact with each other, they meet to form a vertical contact line or butt joint 40v, as shown in FIG. 8 of the drawings. The metal foil layers 32 and 32' are held in place by tape (not shown). This completes the third assembling step for forming the concentric composite laminate structure 20.

The installer in the final step uses a plurality of outer first layers 22 for surrounding the inner third layers 32, as shown in FIGS. 3, 4 and 9 of the drawings. The installer places the inner surface wall 26 of the fire retardant outer layer 22 circumjacently to the outer surface wall 34 of the metal foil layer 32. The installer cuts the circumference (width) of the outer first layers 22, as shown in FIG. 9, such that when the fire retardant outer layers 22 and 22' have encircled the metal foil layers 32 and 32', the perimeter wall edges 28b and 28d, 28b' and 28d' are adjacent to and in contact with each other, where they meet to form horizontal contact lines, butt joints or overlap joints 30h and 30h'. Further, when perimeter wall edges 28c and 28a', 28c' and 28a', and 28c'' and 28a''' of successive layers 22, 22' and 22'' are adjacent to and in contact with each other, they meet to form vertical contact lines, butt joints or overlap joints 30v, 30v' and 30v'', as shown in FIGS. 1 and 9 of the drawings. The fire retardant outer layers 22, 22', 22'' and 22''' are held in place by a series of spaced-apart metal constraint bands 18 or steel wires which hold in place the plurality of formed sections 70, 72, 74 and 76 of the thermal protection wrapping system 10, as depicted in detail by FIGS. 1 and 9. This completes the final and fourth assembling step for forming the concentric composite laminate structure 20 of the continuous thermal protection wrapping system 10.

Alternatively, outer layers 22 of successive sections 70, 72, 74 and 76, may overlap to form an overlapping joint instead of butt joints. For example, outer layers 22 may be 1 to 3 inches wider than the inner layers so that outer layer 22' of section 72 overlaps outer layer 22 of section 70 by 1 to 3 inches.

Figure 10:
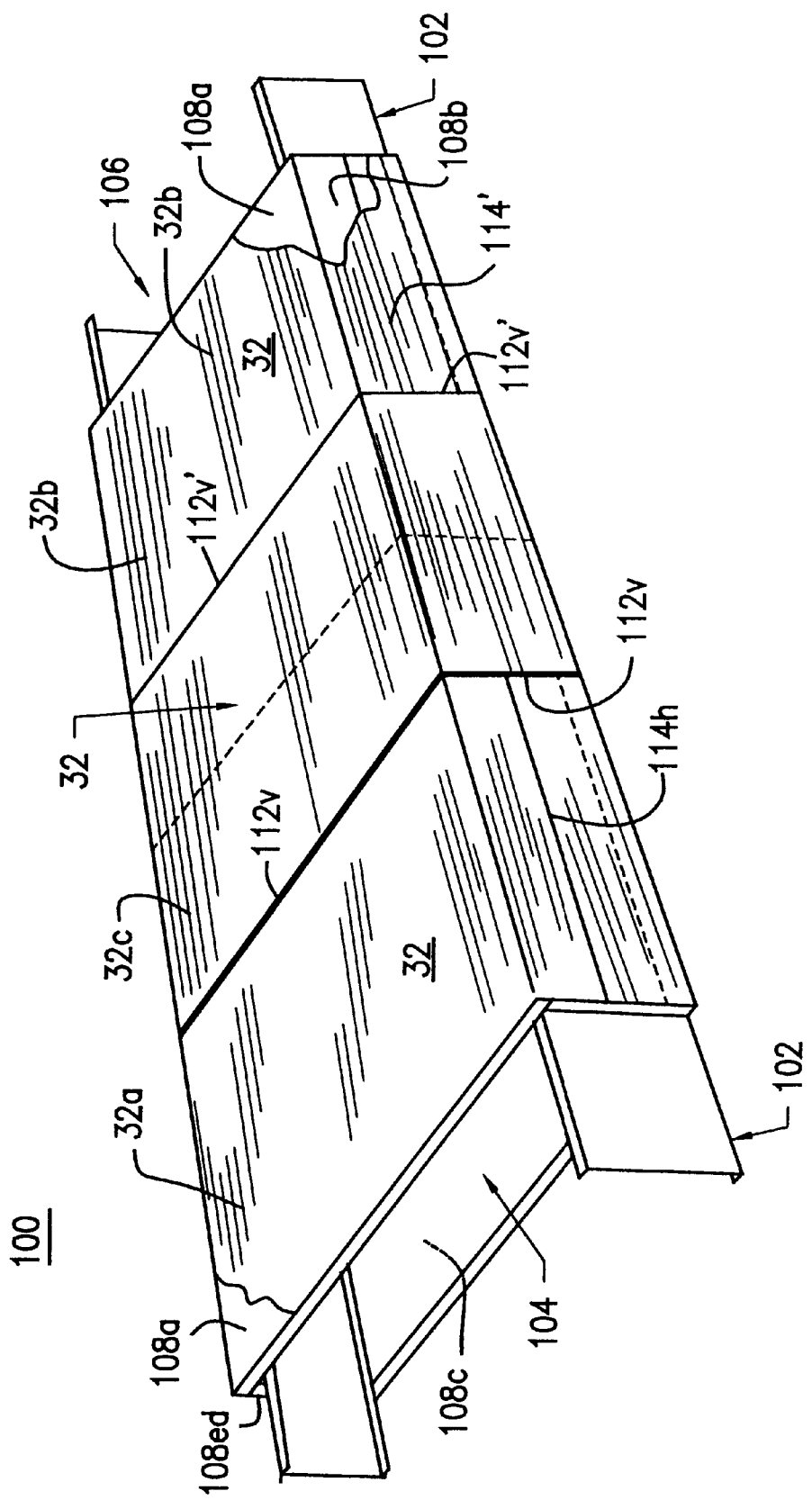
FIG. 10 is a front perspective view of the thermal protection wrapping system of the first alternate embodiment of the present invention showing the inner most layer of metal foil on the cable tray in preparation for concentric attachment of the other multi-ply layers.
Figure 11:
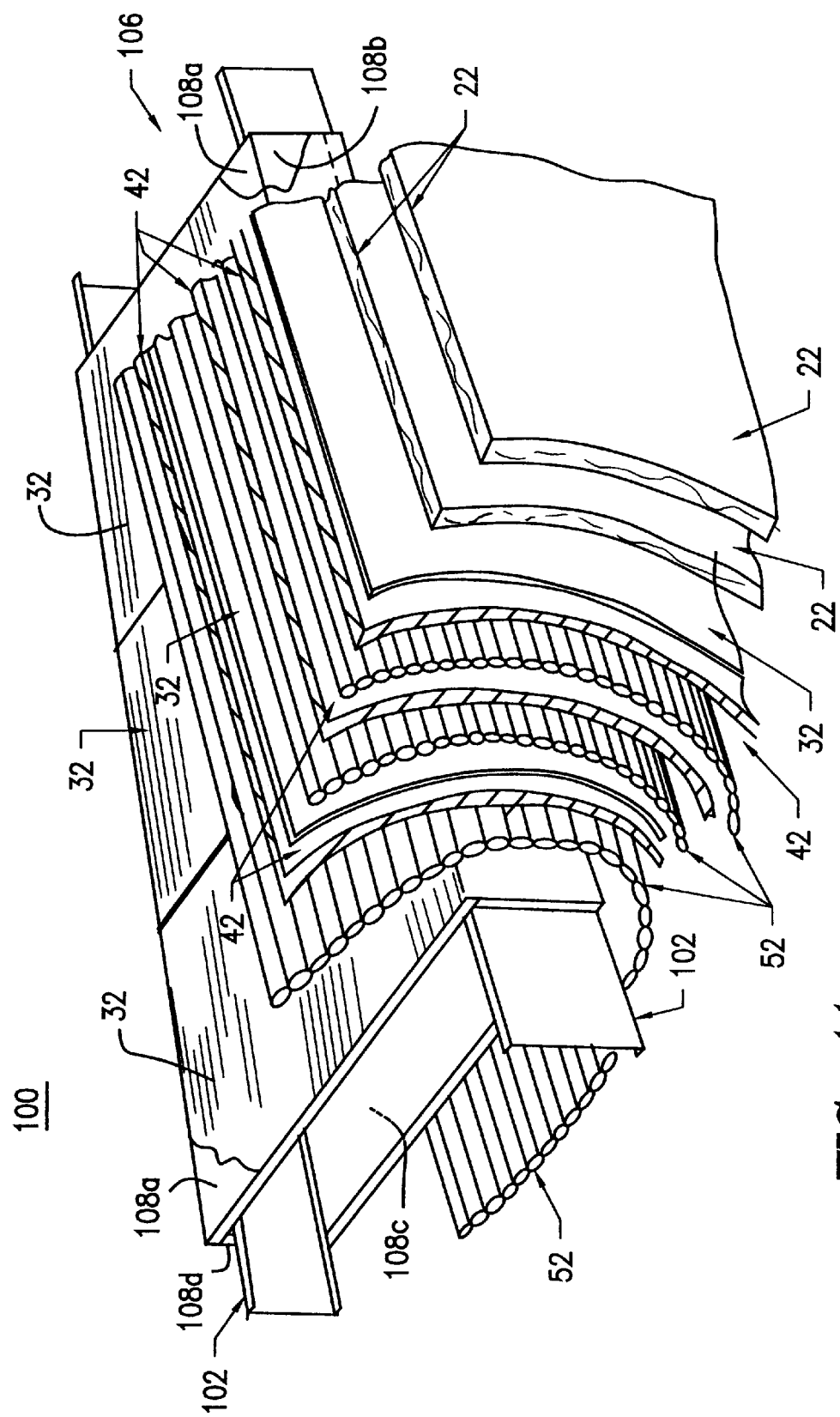
FIG. 11 is an exploded front perspective view of the thermal protection wrapping system of the first alternate embodiment of the present invention showing the multiple concentric layers for forming a multi-ply composite laminate structure in preparation for concentric attachment to the cable tray.
Figure 12:
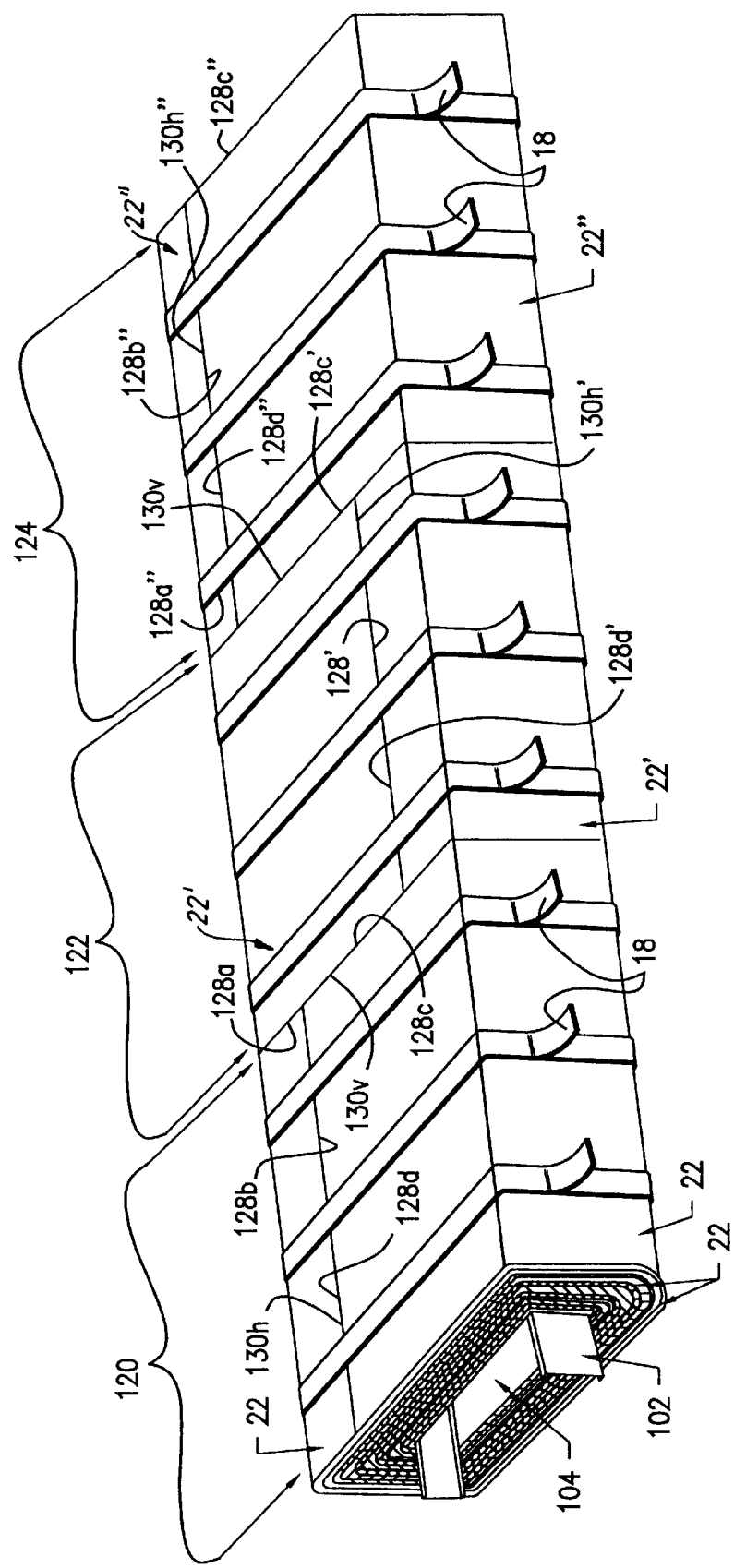
FIG. 12 is a front perspective view of the thermal protection wrapping system of the first alternate embodiment of the present invention showing the concentric composite laminate structure having a plurality of multi-ply concentric layers in the assembled state for protecting the cable tray component from fire and heat.
Figure 13:
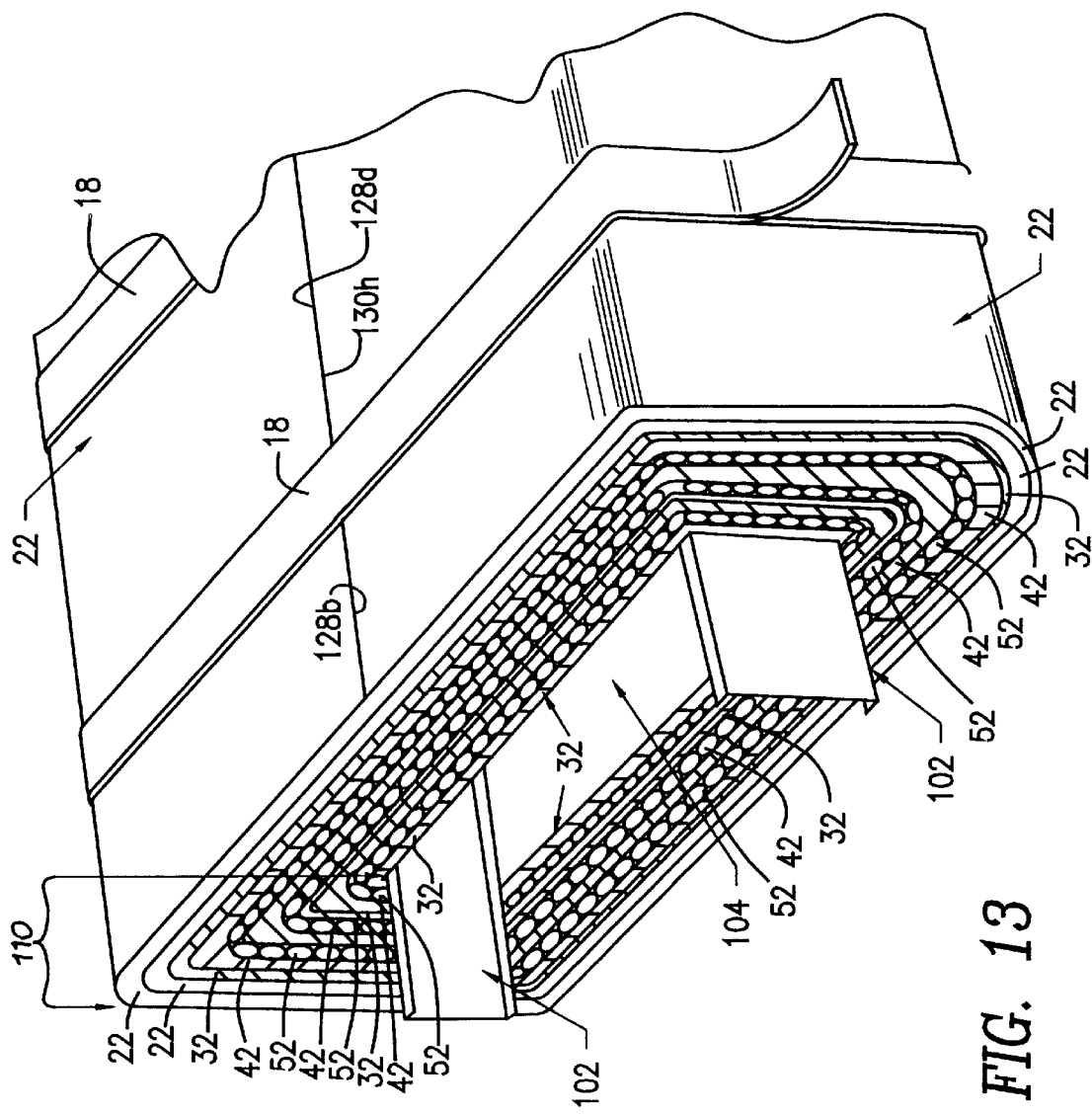
FIG. 13 is an enlarged front perspective view of the thermal protection wrapping system of the first alternate embodiment of the present invention showing the multiple concentric layers for forming a multi-ply composite laminate structure in concentric attachment to the cable tray.

In use, the thermal protection wrapping system 100 of the alternate embodiment, as shown in FIG. 12, includes a plurality of sections 120, 122, 124 that are located side-by-side on the cable tray 102 to form the continuous thermal protection wrapping system 100. The multiple concentric layers of composite laminate structure 110 are installed in a similar manner as in the preferred embodiment 10 having each of the inner layers with appropriate horizontal and vertical contact lines, butt joints or overlap joints. As shown in FIG. 10, the innermost metal foil layers 32 has a center metal foil layer 32C overlapping metal foil layers 32A and 32B by 12 inches which forms vertical overlap joints 112v and 112v'. In addition, metal foil layers 32A and 32B, as previously described, encircle the surface walls 108a to 108d, such that horizontal overlap joints 114h and 114h' are formed, with metal foil layers 32A and 32B overlapping with each other by 2 to 6 inches. As shown in FIG. 12, perimeter wall edges 128b and 128d; 128b' and 128d'; and 128b'' and 128d'' of respective fire retardant outer layers 22, 22' and 22'' are adjacent to and in contact with each other, where they form horizontal overlap joint lines 130h, 130h' and 130h''. Further, when perimeter wall edges 128c and 128a', and 128c' and 128a'' of successive outer layers 22, 22' and 22'' are adjacent to and in contact with each other, they form overlap joint lines 130v and 130v'. The fire retardant outer layers 22, 22' and 22'' are held in place by a series of spaced-apart metal constraint bands 18 which hold in place the plurality of formed sections 120, 122 and 124 of the thermal protection wrapping system 100, as depicted in detail by FIG. 12. This completes the final step for forming the multi-ply concentric composite laminate structure 110, as shown in FIG. 13, of the continuous thermal protection wrapping system 100.

Advantages of the Present Invention

Accordingly, an advantage of the present invention is that it provides for a fire and thermal protection wrapping system for wrapping conduits, cables, cable trays, transmission lines and other electrical transmission systems associated with the transmission of electricity and electrical signals; and gas and oil pipelines which is effective at continuously maintained temperatures up to 2200° F. for at least three hours (3 hrs.) in duration.

Another advantage of the present invention is that it provides for a fire and thermal protection wrapping system that is easy to install, and can be used on all types of equipment and configurations which include cables, conduits, cable trays, condulets, junction boxes, supports, hangars, thermal shorts, and on all configurations of transmission lines having joints, bends, tees, oblique angles and the like.

Another advantage of the present invention is that it provides for a fire and thermal protection wrapping system that is relatively thin and light weight; and can easily be adapted on the job site to adapt to all types of transmission equipment configurations.

Another advantage of the present invention is that it provides for a fire and thermal protection wrapping system that is durable, and can be protected against severe environmental conditions of water, chemicals, impact, temperature fluctuations of extreme hot and cold, and humidity.

Another advantage of the present invention is that it provides for a fire and thermal protection wrapping system that has multiple industry facility applications for operational use that include coal, gas or oil generating plants; electrical and gas utilities; power generating stations; nuclear power generating facilities;

power distribution stations; chemical and pharmaceutical manufacturing facilities; shipping and marine facilities; military installations; telecommunication facilities; airports and the like.

Another advantage of the present invention is that it provides for a fire and thermal protection wrapping system that includes a novel combination of radiation and heat reflection, low thermal conduction, and high endothermic heat absorption.

Another advantage of the present invention is that it provides for a fire and thermal protection wrapping system that includes a concentric composite laminate structure having a plurality of concentric layers for the protection of the electrical transmission devices or pipelines being wrapped.

Another advantage of the present invention is that it provides for a fire and thermal protection wrapping system that provides protection layers including a heat reflection outer shell, an inner reflective lining, a low thermal conductance layer, and an endothermic heat absorption layer surrounding the inner core cable or conduit.

Another advantage of the present invention is that it provides for a fire and thermal protection wrapping system that provides a low ampacity derating for electrical cables and conduits.

A further advantage of the present invention is that it provides for a fire and thermal protection wrapping system that can be easily applied and mass produced in an automated and economical manner, and is cost efficient for a variety of applications.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A fire and heat protection wrapping system for wrapping conduits, cable trays, transmission lines, cables and other electrical transmission devices associated with the transmission of electricity and electrical signals; and gas and oil pipelines, comprising:

a) a concentric composite laminate structure having a plurality of concentric layers for the protection of transmission devices which are exposed to high temperatures in excess of three (3) hours in duration;

b) said plurality of concentric layers incudes an outer first layer, an inner second layer, an inner third layer and an inner core fourth layer for wrapping of transmission devices;

c) said outer first layer being a fiberglass textile having an intumescent coating for resistance to fire, heat, water, and impact; and said outer first layer surrounding said inner second layer and having an inner surface wall in contact with said inner second layer;

d) said inner second layer being a metal foil layer for reflecting heat and eliminating the convection transfer of heat; and said inner second layer surrounding said inner third layer and having an inner surface wall in contact with said inner third layer;

e) said inner third layer being a low conductivity refractory blanket for reducing the transmission of heat; and said inner third layer surrounding said inner core fourth layer and having an inner surface wall in contact with said inner core fourth layer; and f) said inner core fourth layer being a water jacket layer for receiving water to absorb heat from a transmission device and functions as an endothermic layer; and said inner core fourth layer surrounding the core of a transmission device and having an inner surface wall in contact with a transmission device.

2. A fire and heat protection wrapping system in accordance with claim 1, wherein said intumescent coating is a fire retardant coating consisting of a foaming agent, a blowing agent, a charring agent, a binding agent, a solvent, a pigment, flame spread reduction agents, thermal transmission reductive agents, refractory fibers, and stabilizers.

3. A fire and heat protection wrapping system in accordance with claim 2, wherein said intumescent coating further includes mechanical enhancer components for physical impact resistance and adhesion enhancement, water resistance agents, efflorescence reduction agents, and elasticity agents to increase resistance to cracking and shrinking, and to improve ease of spraying and coating.

4. A fire and heat protection wrapping system in accordance with claim 1, wherein said metal foil layer is in the form of sheets made from steel foil, stainless steel foil or aluminum foil.

5. A fire and heat protection wrapping system in accordance with claim 1, wherein said low thermal conductivity refractory blanket layer is selected from the group consisting of ceramic fiber blankets, silicon dioxide and calcium oxide fiber blankets, high silica fiber blankets, and fiber glass blankets.

6. A fire and heat protection wrapping system in accordance with claim 1, wherein said water jacket layer includes a plurality of elongated and sectionalized compartments with each compartment having a liquid coolant contained therein.

7. A fire and heat protection wrapping system in accordance with claim 6, wherein said liquid coolant is selected from the group consisting of water, glycols, freons, alcohols; and any antibacterial, antifungal, denaturizer fluids.

8. A fire and heat protection wrapping system in accordance with claim 6, wherein said sectionalized compartments are made from materials selected from the group consisting of plastics, polypropylene, metallized polypropylene, vinyls, polyethyleneterephthalates, metallized polyethyleneterephthalates, high density polyethylene, polyisophthaloil-chloride-M-phenylenediamine, and poly-para-phenyleneterephthalamide.

9. A fire and heat protection wrapping system for wrapping conduits, cable trays, transmission lines, cables and other electrical transmission devices associated with the transmission of electricity and electrical signals; and gas and oil pipelines, comprising:

a) a concentric composite laminate structure having a plurality of concentric layers for the protection of transmission devices which are exposed to high temperatures in excess of three (3) hours in duration;
 b) said plurality of concentric layers incudes an outer layer, and three inner layers arranged in any order, for wrapping of transmission devices;
 c) said outer layer being a fiberglass textile having an intumescent coating for resistance to fire, heat, water, and impact;
 d) one of said three inner layers being a metal foil layer for reflecting heat and eliminating the convection transfer of heat;
 e) one of said three inner layers being a low conductivity refractory blanket for reducing the transmission of heat; and
 f) one of said three inner layers being a water jacket layer for receiving water to absorb heat from a transmission device and functions as an endothermic layer.

10. A fire and heat protection wrapping system in accordance with claim 9, further including at least two outer layers of fiberglass textile, and at least two inner layers of metal foil, and at least two inner layers of refractory blankets, and at least two inner layers of water jackets, said inner layers being arranged in any order.

11. A fire and heat protection wrapping system in accordance with claim 9, wherein said intumescent coating is a fire retardant coating consisting of a foaming agent, a blowing agent, a charring agent, a binding agent, a solvents a pigment, flame spread reduction agents, thermal transmission reductive agents, refractory fibers, and stabilizers.

12. A fire and heat protection wrapping system in accordance with claim 11, wherein said intumescent coating further includes mechanical enhancer components for physical impact resistance and adhesion enhancement, water resistance agents and efflorescence reduction agents, and elasticity agents to increase resistance to cracking and shrinking, and to improve ease of spraying and coating.

13. A fire and heat protection wrapping system in accordance with claim 9, wherein said metal foil layer is in the form of sheets made from steel foil, stainless steel foil or aluminum foil.

14. A fire and heat protection wrapping system in accordance with claim 9, wherein said low thermal conductivity refractory blanket layer is selected from the group consisting of ceramic fiber blankets, silicon dioxide and calcium oxide fiber blankets, high silica fiber blankets, and fiber glass blankets.

15. A fire and heat protection wrapping system in accordance with claim 9, wherein said water jacket layer includes a plurality of elongated and sectionalized compartments with each compartment having a liquid coolant contained therein.

16. A fire and heat protection wrapping system in accordance with claim 15, wherein said liquid coolant is selected from the group consisting of water, glycols, freons, alcohols, and any antibacterial, antifungal, and denaturizer fluids.

17. A fire and heat protection wrapping system in accordance with claim 15, wherein said sectionalized compartments are made from materials selected from the group consisting of plastics, polypropylene, metallized polypropylene, vinyls, polyethyleneterephthalates, metallized polvethvleneterephthalate, high density polyethylene, polyisophthaloil-chloride-M-phenylenediamine, and poly-para-phenyleneterephthalamide.

* * * * *